US012707411B2

(12) United States Patent
Koskela et al.

(10) Patent No.: US 12,707,411 B2
(45) Date of Patent: Aug. 11, 2026

(54) ACQUIRING TIMING ADVANCE VALUE

(71) Applicant: Nokia Technologies Oy, Espoo (FI)

(72) Inventors: Timo Koskela, Oulu (FI); Samuli Heikki Turtinen, Oulu (FI); Sami-Jukka Hakola, Oulu (FI); Juha Pekka Karjalainen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 350 days.

(21) Appl. No.: 18/493,643

(22) Filed: Oct. 24, 2023

(65) Prior Publication Data

US 2024/0179657 A1 May 30, 2024

(30) Foreign Application Priority Data

Nov. 28, 2022 (GB) .................................... 2217811

(51) Int. Cl.
*H04W 56/00* (2009.01)
*H04W 72/232* (2023.01)

(52) U.S. Cl.
CPC ..... *H04W 56/0045* (2013.01); *H04W 72/232* (2023.01)

(58) Field of Classification Search
None
See application file for complete search history.

(56) References Cited

U.S. PATENT DOCUMENTS

2012/0250520 A1* 10/2012 Chen ................ H04W 56/0045 370/328
2013/0058309 A1* 3/2013 Kuo ................ H04W 56/0045 370/331
2013/0258959 A1* 10/2013 Dinan ............... H04W 74/0833 370/329
2022/0210825 A1* 6/2022 Zhu ................... H04W 74/0833
2022/0279453 A1* 9/2022 Dinan .................. H04B 7/2618
2023/0199638 A1* 6/2023 Kung ................ H04W 56/0045 370/328
2024/0023045 A1* 1/2024 Da Silva ............ H04W 36/249
2024/0250798 A1* 7/2024 Agiwal ................ H04B 7/0639

(Continued)

FOREIGN PATENT DOCUMENTS

WO 2022/130207 A1 6/2022
WO 2022/212308 A1 10/2022

OTHER PUBLICATIONS

Extended European Search Report received for corresponding European Patent Application No. 23206573.0, dated Apr. 29, 2024, 6 pages.

(Continued)

*Primary Examiner* — Duc T Duong
(74) *Attorney, Agent, or Firm* — Lippes Mathias LLP

(57) ABSTRACT

Embodiments of the present disclosure relate to acquiring a Timing Advance (TA) value. A terminal device being connected with a serving cell or a primary cell of the terminal device transmits a signal to a network device supporting a non-serving cell or a secondary cell of the terminal device, wherein a physical cell identifier (PCI) of the non-serving cell is different from a PCI of the serving cell. The terminal device starts, based on the transmission of the signal, a timer at the terminal device. The terminal device acquires, while the timer is running, a timing advance (TA) value associated with the non-serving cell or the secondary cell.

17 Claims, 6 Drawing Sheets

(56) References Cited

U.S. PATENT DOCUMENTS

| | | | | |
|---|---|---|---|---|
| 2024/0323876 | A1* | 9/2024 | Yuan | H04W 56/001 |
| 2025/0133598 | A1* | 4/2025 | Matsumura | H04W 48/16 |
| 2025/0185070 | A1* | 6/2025 | Guo | H04W 76/20 |
| 2025/0331032 | A1* | 10/2025 | He | H04B 17/328 |

OTHER PUBLICATIONS

"3rd Generation Partnership Project; Technical Specification Group Radio Access Network; NR; Physical layer procedures for control (Release 17)", 3GPP TS 38.213, V17.3.0, Sep. 2022, pp. 1-260.

"3rd Generation Partnership Project; Technical Specification Group Radio Access Network; NR; NR and NG-RAN Overall Description; Stage 2 (Release 17)", 3GPP TS 38.300, V17.2.0, Sep. 2022, pp. 1-210.

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.

"IEEE 802.11", Wikipedia, Retrieved on Nov. 4, 2023, Webpage available at : https://en.wikipedia.org/wiki/ IEEE 802.11.

"3rd Generation Partnership Project; Technical Specification Group Radio Access Network; NR; Medium Access Control (MAC) protocol specification (Release 17)", 3GPP TS 38.321, V17.2.0, Sep. 2022, pp. 1-246.

Combined Search and Examination Report received for corresponding United Kingdom Patent Application No. 2217811.5, dated May 26, 2023, 2 pages.

"Non-serving cell TA management for NR L1/L2 mobility enhancement", 3GPP TSG RAN WG1 #110bis-e, R1-2209755, Agenda item: 9.12.2, Samsung, Oct. 10-19, 2022, pp. 1-3.

* cited by examiner 150
141
UE
142
gNB
RA preamble and PDSCH assignment
151
transmission of random access preamble and PDSCH payload
152
transmission of random access response
153

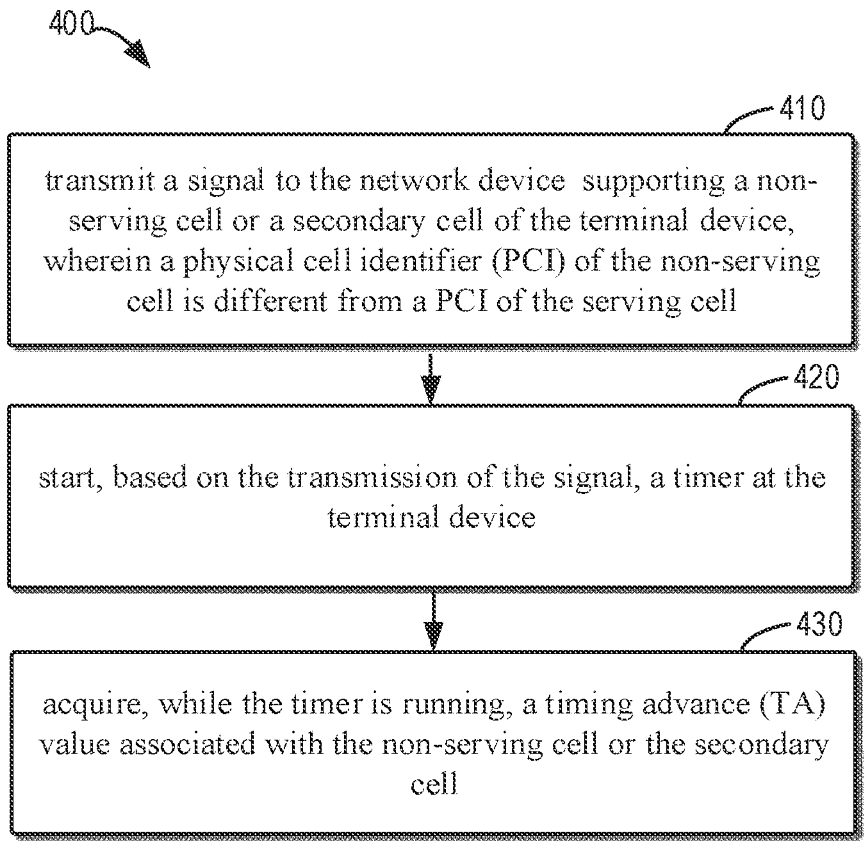

Fig. 4

transmit, to the terminal device being connected with a serving cell or a primary cell of the terminal device, a configuration of a timer at the terminal device for the terminal device to acquire a timing advance (TA) value associated with a non-serving cell or a secondary cell of the terminal device while the timer is running, wherein a physical cell identifier (PCI) of the non-serving cell is different from a PCI of the serving cell

Fig. 5

ACQUIRING TIMING ADVANCE VALUE

RELATED APPLICATION

This application claims priority from, and the benefit of, GB Application No.: 2217811.5 filed on Nov. 28, 2022, which is hereby incorporated by reference in its entirety.

FIELD

Various example embodiments relate to the field of telecommunication and in particular, to methods, devices, apparatuses and computer readable storage medium for acquiring a Timing Advance (TA) value.

BACKGROUND

In the communications area, there is a constant evolution ongoing in order to provide efficient and reliable solutions for utilizing wireless communication networks. Each new generation has it owns technical challenges for handling the different situations and processes that are needed to connect and serve devices connected to the wireless network. To meet the demand for wireless data traffic having increased since deployment of 4th generation (4G) communication systems, efforts have been made to develop an improved 5th generation (5G) or pre-5G communication system. The new communication systems can support various types of service applications for terminal device 110*s*.

RAN1 studies, and if justified, specifies the following: Two TAs for UL multi-DCI for multi-TRP operation: Power control for UL single DCI for multi-TRP operation where unified TCI framework extension in objective 2 is assumed.

SUMMARY

In general, example embodiments of the present disclosure provide a solution for acquiring a timing advance (TA) value.

In a first aspect, there is provided a terminal device. The terminal device comprises at least one processor; and at least one memory storing instructions that, when executed by the at least one processor, cause the terminal device being connected with a serving cell or a primary cell of the terminal device, at least to: transmit a signal to a network device supporting a non-serving cell or a secondary cell of the terminal device, wherein a physical cell identifier (PCI) of the non-serving cell is different from a PCI of the serving cell: start, based on the transmission of the signal, a timer at the terminal device: and acquire, while the timer is running, a timing advance (TA) value associated with the non-serving cell or the secondary cell.

In a second aspect, there is provided a network device. The network device comprises at least one processor: and at least one memory storing instructions that, when executed by the at least one processor, cause the network device at least to: transmit, to a terminal device being connected with a serving cell or a primary cell of the terminal device, a configuration of a timer at the terminal device for the terminal device to acquire a timing advance (TA) value associated with a non-serving cell or a secondary cell of the terminal device while the timer is running, wherein a physical cell identifier (PCI) of the non-serving cell is different from a PCI of the serving cell.

In a third aspect, there is provided a method. The method comprises transmitting, by a terminal device being connected with a serving cell or a primary cell of the terminal device, a signal to a network device supporting a non-serving cell or a secondary cell of the terminal device, wherein a physical cell identifier (PCI) of the non-serving cell is different from a PCI of the serving cell: starting, by the terminal device and based on the transmission of the signal, a timer at the terminal device: and acquiring, by the terminal device and while the timer is running, a timing advance (TA) value associated with the non-serving cell or the secondary cell.

In a fourth aspect, there is provided a method. The method comprises transmitting, by a network device and to a terminal device being connected with a serving cell or a primary cell of the terminal device, a configuration of a timer at the terminal device for the terminal device to acquire a timing advance (TA) value associated with a non-serving cell or a secondary cell of the terminal device while the timer is running, wherein a physical cell identifier (PCI) of the non-serving cell is different from a PCI of the serving cell.

In a fifth aspect, there is provided an apparatus. The apparatus being connected with a serving cell or a primary cell of the apparatus comprises means for transmitting a signal to a network device supporting a non-serving cell or a secondary cell of the apparatus, wherein a physical cell identifier (PCI) of the non-serving cell is different from a PCI of the serving cell: means for starting, based on the transmission of the signal, a timer at the apparatus: and means for acquiring, while the timer is running, a timing advance (TA) value associated with the non-serving cell or the secondary cell.

In a sixth aspect, there is provided an apparatus. The apparatus comprises means for transmitting, to a terminal device being connected with a serving cell or a primary cell of the terminal device, a configuration of a timer at the terminal device for the terminal device to acquire a timing advance (TA) value associated with a non-serving cell or a secondary cell of the terminal device while the timer is running, wherein a physical cell identifier (PCI) of the non-serving cell is different from a PCI of the serving cell.

In a seventh aspect, there is provided a non-transitory computer readable medium comprising program instructions that, when executed by an apparatus, cause the apparatus being connected with a serving cell or a primary cell of the apparatus at least to: transmit a signal to a network device supporting a non-serving cell or a secondary cell of the apparatus, wherein a physical cell identifier (PCI) of the non-serving cell is different from a PCI of the serving cell: start, based on the transmission of the signal, a timer at the apparatus: and acquire, while the timer is running, a timing advance (TA) value associated with the non-serving cell or the secondary cell.

In an eighth aspect, there is provided a non-transitory computer readable medium comprising program instructions that, when executed by an apparatus, cause the apparatus at least to transmit, to a terminal device being connected with a serving cell or a primary cell of the terminal device, a configuration of a timer at the terminal device for the terminal device to acquire a timing advance (TA) value associated with a non-serving cell or a secondary cell of the terminal device, wherein a physical cell identifier (PCI) of the non-serving cell is different from a PCI of the serving cell.

In a ninth aspect, there is provided a computer program comprising instructions that, when executed by an apparatus, cause the apparatus being connected with a serving cell or a primary cell of the apparatus at least to: transmit a signal to a network device supporting a non-serving cell or a secondary cell of the apparatus, wherein a physical cell identifier (PCI) of the non-serving cell is different from a PCI of the serving cell: start, based on the transmission of the signal, a timer at the apparatus: and acquire, while the timer is running, a timing advance (TA) value associated with the non-serving cell or the secondary cell.

In a tenth aspect, there is provided a computer program comprising instructions that, when executed by an apparatus, cause the apparatus at least to transmit, to a terminal device being connected with a serving cell or a primary cell of the terminal device, a configuration of a timer at the terminal device for the terminal device to acquire a timing advance (TA) value associated with a non-serving cell or a secondary cell of the terminal device, wherein a physical cell identifier (PCI) of the non-serving cell is different from a PCI of the serving cell.

In an eleventh aspect, there is provided a terminal device. The terminal device comprises transmitting circuitry configured to transmit a signal to a network device supporting a non-serving cell or a secondary cell of the terminal device, wherein a physical cell identifier (PCI) of the non-serving cell is different from a PCI of the serving cell: starting circuitry configured to start, based on the transmission of the signal, a timer at the terminal device: and acquiring circuitry configured to acquire, while the timer is running, a timing advance (TA) value associated with the non-serving cell or the secondary cell.

In a twelfth aspect, there is provided a network device. The network device comprises transmitting circuitry configured to transmit, to a terminal device being connected with a serving cell or a primary cell of the terminal device, a configuration of a timer at the terminal device for the terminal device to acquire a timing advance (TA) value associated with a non-serving cell or a secondary cell of the terminal device while the timer is running, wherein a physical cell identifier (PCI) of the non-serving cell is different from a PCI of the serving cell.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIG. 4 illustrates a flowchart of a method implemented at a terminal device according to some embodiments of the present disclosure:

FIG. 5 illustrates a flowchart of a method implemented at a network device according to some embodiments of the present disclosure:

Throughout the drawings, the same or similar reference numerals represent the same or similar element.

DETAILED DESCRIPTION

Figure 1A:
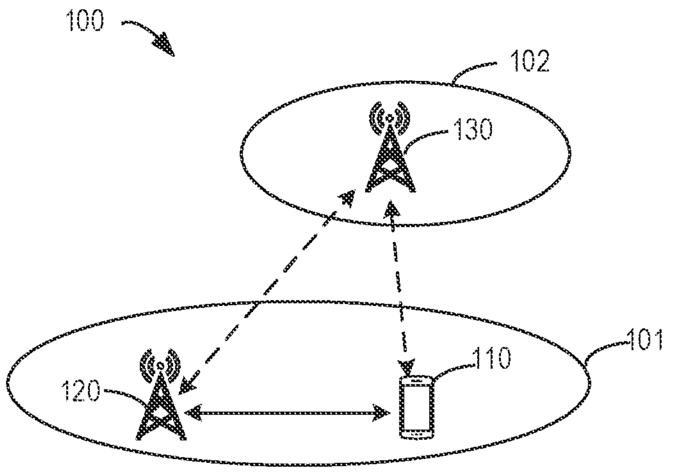
FIG. 1A illustrates an example communication system in which embodiments of the present disclosure may be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IOT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) communication protocols, and/or any other protocols either currently known or to be developed in the future (e.g. future sixth generation, 6G). Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico, and so forth, depending on the applied terminology and technology.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and play back appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

RAN1 studies or specifies the following:

1. Study, and if justified, specify CSI reporting enhancement for high/medium UE velocities by exploiting time-domain correlation/Doppler-domain information to assist DL precoding, targeting FR1, as follows: Rel-16/17 Type-II codebook refinement, without modification to the spatial and frequency domain basis: UE reporting of time-domain channel properties measured via CSI-RS for tracking.
2. Specify extension of Rel-17 Unified TCI framework for indication of multiple DL and UL TCI states focusing on multi-TRP use case, using Rel-17 unified TCI framework.
3. Study; and if justified, specify larger number of orthogonal DMRS ports for downlink and uplink MU-MIMO (without increasing the DM-RS overhead), only for CP-OFDM. Striving for a common design between DL and UL DMRS. Up to 24 orthogonal DM-RS ports, where for each applicable DMRS type, the maximum number of orthogonal ports is doubled for both single- and double-symbol DMRS.
4. Study, and if justified, specify enhancements of CSI acquisition for Coherent-JT targeting FR1 and up to 4 TRPs, assuming ideal backhaul and synchronization as well as the same number of antenna ports across TRPs, as follows: Rel-16/17 Type-II codebook refinement for CJT mTRP targeting FDD and its associated CSI reporting, taking into account throughput-overhead trade-off: SRS enhancement to manage inter-TRP cross-SRS interference targeting TDD CJT via SRS capacity enhancement and/or interference randomization, with the constraints that 1) without consuming additional resources for SRS; 2) reuse existing SRS comb structure: 3) without new SRS root sequences. It should be noted that the maximum number of CSI-RS ports per resource remains the same as in Rel-17, i.e. 32.
5. Study, and if justified, specify UL DMRS, SRS, SRI, and TPMI (including codebook) enhancements to enable 8 Tx UL operation to support 4 and more layers per UE in UL targeting CPE/FWA/vehicle/Industrial devices. It should be noted that potential restrictions on the scope of this objective (including coherence assumption, full/non-full power modes) will be identified as part of the study.

6. Study, and if needed, specify the following items to facilitate simultaneous multi-panel UL transmission for higher UL throughput/reliability, focusing on FR2 and multi-TRP, assuming up to 2 TRPs and up to 2 panels, targeting CPE/FWA/vehicle/industrial devices (if applicable). UL precoding indication for PUSCH, where no new codebook is introduced for multi-panel simultaneous transmission. The total number of layers is up to four across all panels and total number of codewords is up to two across all panels, considering single DCI and multi-DCI based multi-TRP operation. UL beam indication for PUCCH/PUSCH, where unified TCI framework extension in objective 2 is assumed, considering single DCI and multi-DCI based multi-TRP operation. For the case of multi-DCI based multi-TRP operation, only PUSCH+PUSCH, or PUCCH+PUCCH is transmitted across two panels in a same CC.
7. Study, and if justified, specify the following: two TAs for UL multi-DCI for multi-TRP operation: and power control for UL single DCI for multi-TRP operation where unified TCI framework extension in objective 2 is assumed. For the case of simultaneous UL transmission from multiple panels, the operation will only be limited to the objective 6 scenarios.

In RAN1 #111, the following is being currently discussed regarding random access response (RAR) reception when the PDDCH order is triggered to a cell other than serving cell.

In RAN1 #110bis-e, the following agreement was made: for inter-cell multi-DCI based Multi-TRP operation with two TA enhancement, support one of the alternatives (down selection to be done in RAN1 #111): Alt 1: PDCCH scheduling RAR will always be received from serving cell, there is no need for additional type 1 CSS (Common Search Space Set) configuration per additional PCI; Alt 2: In addition to PDCCH scheduling RAR being received from serving cell, reception of PDCCH scheduling RAR from a TRP corresponding to an additional PCI for a RACH (Random Access Channel) procedure associated to the additional PCI is supported, additional type 1 CSS configuration per additional PCI needs to be supported. A slight majority of companies prefer not to support additional type 1 CSS configuration per additional PCI. Hence, there is no consensus to introduce additional type 1 CSS configuration per additional PCI. This by default implies Alt 1 as proposed below: For inter-cell multi-DCI (Downlink Control Information) based Multi-TRP operation with two TA enhancement, support PDCCH (Physical Downlink Control Channel) scheduling RAR (Random Access Response) always being received from serving cell. There is no need for additional type 1 CSS configuration per additional PCI (Physical Cell ID).

In the current proposal the UE would monitor the RAR response for the PDCCH ordered RACH towards a cell other than serving celled the RACH, on the serving cell. Due to the beam alignment, synchronization delay (i.e. switch the reception back to serving cell) and to accommodate potential long backhaul latency, in some cases additional delay for starting the monitoring may be needed. Furthermore, since the proposed RACH procedure would deviate from the current QCL (Quasi Co-location) rules defined for RACH procedure, additional means and design would be needed to enable UE to perform the RA procedure where the RA preamble transmission and Random access reception are from the different cells (e.g. serving/non-serving). The non-serving cell may be a cell having a different PCI than a serving cell). In some cases additional procedures may need to be defined that teach beyond the currently defined RACH procedure for obtaining a the TA value of a cell that is not configured as serving cell.

Principle and embodiments of the present disclosure will be described in detail below with reference to the accompanying drawings. Reference is first made to FIG. 1A, which illustrates an example communication system 100 in which embodiments of the present disclosure may be implemented. The system 100 includes one or more terminal devices 110 (one terminal device 110 is shown as an example) and a plurality of network devices (a network device 120 and a network device 130 are shown as an example). The network devices 120, 130 serve respective areas 101 and 102 (also called as cells 101 and 102) using different frequency bands in both DL and UL. The terminal devices 110 are capable of connecting and communicating in an UL and DL with either or both of the network devices 120, 130 as long as the terminal devices 110 located within the corresponding cells 101, 102. In communication systems, an UL refers to a link in a direction from a terminal device 110 to a network device 120 or 130, and a DL refers to a link in a direction from the network device 120, 130 to the terminal device 110. In addition to communicating the terminal devices 110, the network devices 120, 130 may also communicate with each other. In some embodiments, the cell 101 corresponding to the network device 120 may be a serving cell of the terminal device 110, and the cell 102 corresponding to the network device 130 may be a non-serving cell of the terminal device 110. The non-serving cell may be a cell having a different PCI than a serving cell. In some other embodiments, the cell 101 corresponding to the network device 120 may be a primary cell of the terminal device 110, and the cell 102 corresponding to the network device 130 may be a secondary cell of the terminal device 110. The secondary cell may be a cell having a different PCI or same PCI than a primary cell. In some other embodiments, the network device 120 and the network device 130 may be the same network device or the different network devices.

It is to be understood that the number of network devices 120, 130 and terminal device 110 is only for the purpose of illustration without suggesting any limitations. The system 100 may include any suitable number of network devices 120, 130 and terminal devices 110 adapted for implementing embodiments of the present disclosure.

Communications in the communication system 100 may be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Division Multiple Access (CDMA), Frequency Division Multiple Access (FDMA), Time Division Multiple Access (TDMA), Frequency Division Duplex (FDD), Time Division Duplex (TDD), Multiple-Input Multiple-Output (MIMO), Orthogonal Frequency Division Multiple (OFDM), Discrete Fourier Transform spread OFDM (DFTs-OFDM) and/or any other technologies currently known or to be developed in the future.

The present disclosure relates to feMIMO evolution work item in RAN1. More specifically it relates to the multi TA (Timing Advance) maintenance/operation.

Figure 1B:
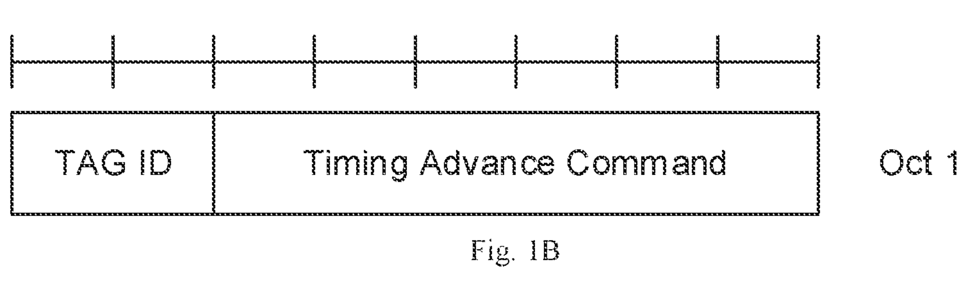
FIG. 1B illustrates a schematic diagram of timing advance command MAC CE.

Timing Advance Command MAC CE is identified by MAC subheader with LCID as specified in the related 3GPP specifications. With reference to FIG. 1B, it has a fixed size and consists of a single octet defined as follows: TAG Identity (TAG ID) and Timing Advance Command. TAG Identity (TAG ID), this field indicates the TAG Identity of the addressed TAG. The TAG containing the SpCell has the TAG Identity 0. The length of the field is 2 bits. Timing Advance Command, this field indicates the index value TA (0, 1, 2 . . . 63) used to control the amount of timing adjustment that MAC entity has to apply (as specified in TS 38.213 [6]). The length of the field is 6 bits.

Figure 1C:
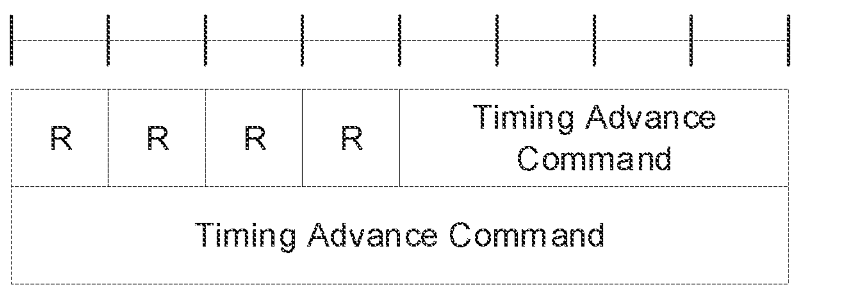
FIG. 1C illustrates a schematic diagram of absolute timing advance command MAC CE.

Absolute Timing Advance Command MAC CE is identified by MAC subheader with eLCID as specified in the related 3GPP specifications. With reference to FIG. 1C, It has a fixed size and consists of two octets defined as follows: Timing Advance Command and R. Timing Advance Command, this field indicates the index value TA used to control the amount of timing adjustment that the MAC entity has to apply in TS 38.213 [6]. The size of the field is 12 bits. R denotes reserved bit, set to "0".

The CFRA (Contention Free Random Access) random access procedure as defined in the related 3GPP specifications. Random Access Procedures may include two types: CFRA with 4-step RA type and CFRA with 2-step RA (Random Access) type. The MSG1 of the 4-step RA type consists of a preamble on PRACH. After MSG1 transmission, the UE monitors for a response from the network within a configured window. For CFRA, dedicated preamble for MSG1 transmission is assigned by the network and upon receiving random access response from the network, the UE ends the random access procedure. For CBRA, upon reception of the random access response, the UE sends MSG3 using the UL grant scheduled in the response and monitors contention resolution. If contention resolution is not successful after MSG3 (re)transmission(s), the UE goes back to MSG1 transmission.

Figures 1D, 1E:
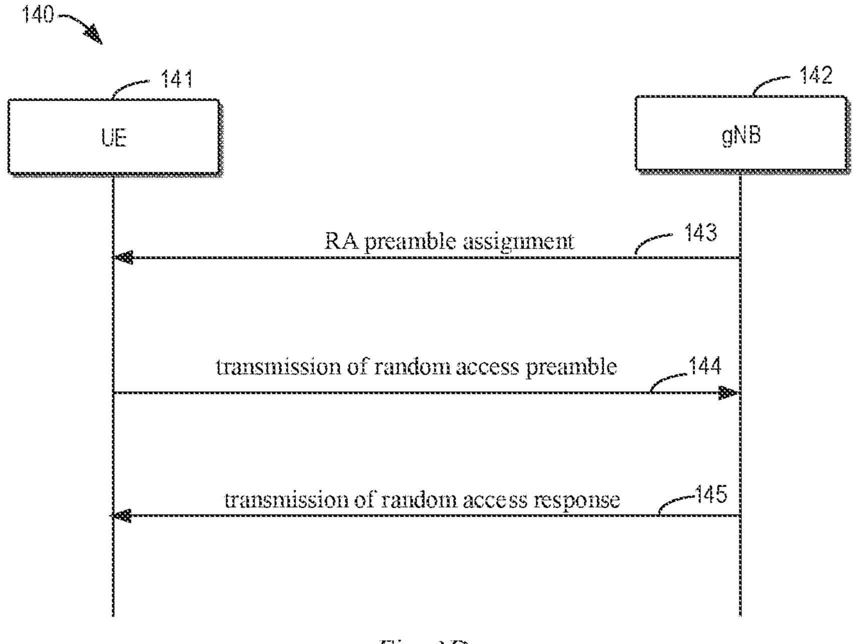
FIG. 1D and FIG. 1E illustrate schematic diagrams of random access procedures.

FIG. 1D and FIG. 1E illustrate schematic diagrams of random access procedures, in which FIG. 1D shows a process 140 of CFRA with 4-step RA type. Step 143, a gNB 142 performs RA preamble assignment to the UE 141. Step 144, the UE 141 transmits a random access preamble to the gNB 142. Step 145, the gNB 142 transmits a random access response to the UE 141. FIG. 1E shows a process 150 of CFRA with 2-step RA type. Step 151, a gNB 142 performs RA preamble and PDSCH assignment to the UE 141. Step 152, the UE 141 transmits a random access preamble, and transmits PDSCH payload to the gNB 142. Step 153, the gNB 142 transmits a random access response to the UE 141.

With respect to random access response, for type-1 random access procedure, in response to a PRACH transmission, a UE attempts to detect a DCI format 1_0 with CRC scrambled by a corresponding RA-RNTI during a window controlled by higher layers [11, TS 38.321]. The window starts at the first symbol of the earliest CORESET (Control Resource Set) the UE is configured to receive PDCCH for Type1-PDCCH CSS set, as defined in clause 10.1, that is at least one symbol, after the last symbol of the PRACH occasion corresponding to the PRACH transmission, where the symbol duration corresponds to the SCS for Type1-PDCCH CSS set as defined in clause 10.1.

The IE RACH-ConfigGeneric is used to specify the random-access parameters both for regular random access as well as for beam failure recovery. With reference to Table 1, RACH-ConfigGeneric field descriptions is shown in Table 1. It should be noted that the maximum RAR window length is 10 ms in licensed spectrum.

TABLE 1

| RACH-ConfigGeneric field descriptions |
|---|
| msg1-FDM<br>The number of PRACH transmission occasions FDMed in one time instance. (see TS 38.211 [16], clause 6.3.3.2). |
| msg1-FrequencyStart<br>Offset of lowest PRACH transmission occasion in frequency domain with respective to PRB 0. The value is configured so that the corresponding RACH resource is entirely within the bandwidth of the UL BWP. (see TS 38.211 [16], clause 6.3.3.2). |
| powerRampingStep<br>Power ramping steps for PRACH (see TS 38.321 [3], 5.1.3). |
| prach-ConfigurationFrameOffset-IAB<br>Frame offset for ROs defined in the baseline configuration indicated by prach-ConfigurationIndex and is used only by the IAB-MT. (see TS 38.211 [16], clause 6.3.3.2). |
| prach-ConfigurationIndex<br>PRACH configuration index. For prach-ConfigurationIndex configured under beamFailureRecovery-Config, the prach-ConfigurationIndex can only correspond to the short preamble format, (see TS 38.211 [16], clause 6.3.3.2). If the field prach-ConfigurationIndex-v1610 is present, the UE shall ignore the value provided in prach-ConfigurationIndex (without suffix). |
| prach-ConfigurationPeriodScaling-IAB<br>Scaling factor to extend the periodicity of the baseline configuration indicated by prach-ConfigurationIndex and is used only by the IAB-MT. Value scf1 corresponds to scaling factor of 1 and so on. (see TS 38.211 [16], clause 6.3.3.2). |
| prach-ConfigurationSOffset-IAB<br>Subframe/Slot offset for ROs defined in the baseline configuration indicated by prach-ConfigurationIndex and is used only by the IAB-MT. (see TS 38.211 [16], clause 6.3.3.2). |
| preambleReceivedTargetPower<br>The target power level at the network receiver side (see TS 38.213 [13], clause 7.4, TS 38.321 [3], clauses 5.1.2, 5.1.3). Only multiples of 2 dBm may be chosen (e.g. −202, −200, −198, . . .). |
| preambleTransMax<br>Max number of RA preamble transmission performed before declaring a failure (see TS 38.321 [3], clauses 5.1.4, 5.1.5). |

TABLE 1-continued

| RACH-ConfigGeneric field descriptions |
|---|
| ra-Response Window<br>Msg2 (RAR) window length in number of slots. The network configures a value lower than or equal to 10 ms when Msg2 is transmitted in licensed spectrum and a value lower than or equal to 40 ms when Msg2 is transmitted with shared spectrum channel access (see TS 38.321 [3], clause 5.1.4). UE ignores the field if included in SCellConfig. If ra-ResponseWindow-v1610 is signalled, UE shall ignore the ra-Response Window (without suffix). |
| zeroCorrelationZoneConfig<br>N-CS configuration, see Table 6.3.3.1-5 in TS 38.211 [16]. |

Figure 1F:
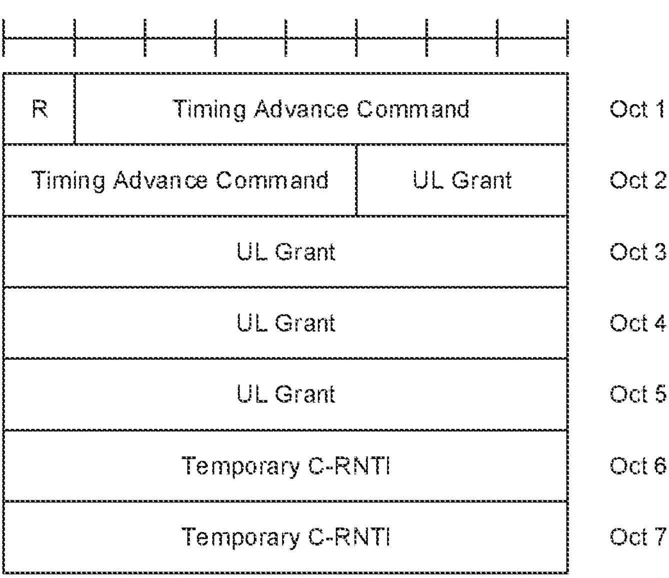
FIG. 1F illustrates a schematic diagram of MAC RAR.

With reference to FIG. 1F. The MAC RAR is of fixed size, and consists of the following fields:

R: Reserved bit, set to 0):

Timing Advance Command: The Timing Advance Command field indicates the index value TA used to control the amount of timing adjustment that the MAC entity has to apply in TS 38.213 [6]. The size of the Timing Advance Command field is 12 bits;

UL Grant: The Uplink Grant field indicates the resources to be used on the uplink in TS 38.213 [6]. The size of the UL Grant field is 27 bits:

Temporary C-RNTI: The Temporary C-RNTI field indicates the temporary identity that is used by the MAC entity during Random Access. The size of the Temporary C-RNTI field is 16 bits. The MAC RAR is octet aligned.

With reference to Table 2, the RA-RNTI is used for monitoring RA response.

TABLE 2

| RNTI | Usage | Transport Channel | Logical Channel |
|---|---|---|---|
| P-RNTI | Paging and System Information change notification | PCH | PCCH |
| SI-RNTI | Broadcast of System Information | DL-SCH | BCCH |
| RA-RNTI | Random Access Response | DL-SCH | N/A |

QC considered the following aspect: If PDCCH order triggers PRACH transmission toward an active additional PCI in the CC, PDCCH scheduling RAR is received from serving cell PCI of the SpCell. For Further Study: Whether additional delay for starting the RAR response window is needed to accommodate the non-ideal backhaul, and when the CC (Component Carrier) is SpCell, whether the existing QCL relationship in SpCell between PDCCH order DCI and RAR PDCCH/PDSCH needs to be relaxed when PDCCH order is from additional PCI but Type1 CSS is coming from serving PCI. QC considers possibility to impose additional delay for RAR monitoring window start but does not disclose dynamically configured or conditionally applied delay. Also QC does not consider any implicit rules.

Figure 2:
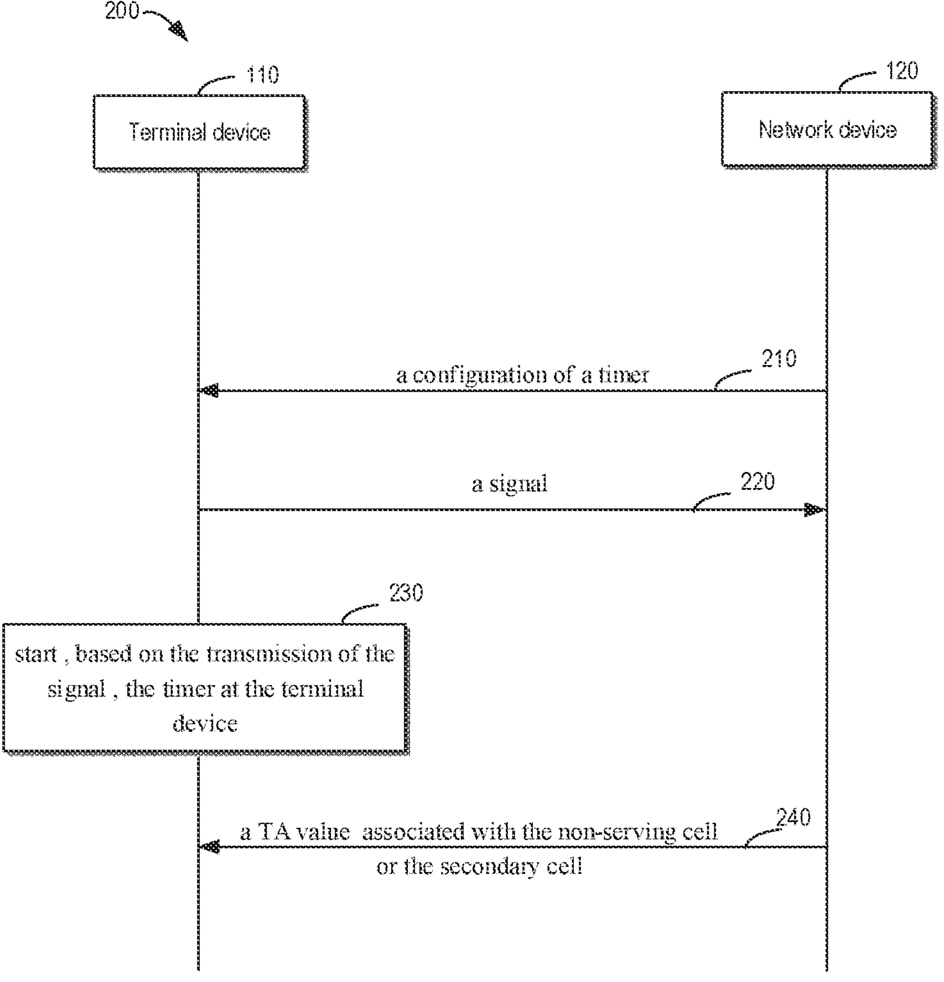
FIG. 2 illustrates a schematic diagram illustrating a process of communication between devices according to some embodiments of the present disclosure.

FIG. 2 illustrates a schematic diagram illustrating a process 200 of communication between devices according to some embodiments of the present disclosure. As shown in FIG. 2, the interaction between the terminal device 110 and the network device 120 is involved. The network device 120 may transmit (210), to the terminal device 110 being connected with a serving cell or a primary cell of the terminal device 110, a configuration of a timer at the terminal device 110 for the terminal device 110 to acquire a timing advance (TA) value associated with a non-serving cell or a secondary cell of the terminal device 110 while the timer is running. The terminal device 110 may transmit (220) a signal to the network device 120 (may be the same network device as the network device 130) supporting a non-serving cell or a secondary cell of the terminal device 110, wherein a physical cell identifier (PCI) of the non-serving cell is different from a PCI of the serving cell. The terminal device 110 may start (230), based on the transmission of the signal, the timer at the terminal device 110. The terminal device 110 may acquire (240), while the timer is running, the timing advance (TA) value associated with the non-serving cell or the secondary cell.

In the embodiments of the present disclosure, a terminal device (for example, the terminal device 110) can monitor random access response for the PDCCH ordered RACH towards a cell other than a serving cell or a primary cell.

In some embodiments, on the terminal device 110 side, prior to transmitting the signal to the network device 120, the terminal device 110 may receive the configuration of the timer from the serving cell or the primary cell. In some embodiments, the configuration of the timer may include a value of the timer.

In some embodiments, the configuration may indicate the terminal device 110 to at least one of the following: start the timer based on transmission of a signal to the network device 120; or stop the timer in response to the reception of the response to the signal.

In some embodiments, the terminal device 110 may receive, from the serving cell or the primary cell, a response to the signal, wherein the response may comprise the TA value associated with the non-serving cell or the secondary cell.

In some embodiments the non-serving cell may refer to a cell having a different PCI than a serving cell. In some embodiments the non-serving cell may refer to a cell having a different PCI than a serving cell and that the cell may configured with inter-cell beam management. In inter-cell beam management, the UE may be configured to communicate with a cell with different PCI than a serving cell while maintaining association/connection to the serving cell (the serving cell, e.g. PCell or SCell).

In some embodiments, the terminal device 110 may monitor, while the timer is running and on a UE dedicated search space (USS) set of the serving cell (e.g. the primary cell, or a serving cell that triggered the uplink transmission for obtaining/acquiring a TA value), a physical downlink control channel (PDCCH) associated with the response to the signal, using a cell radio network temporary identifier (C-RNTI). That is, when the timer is running, the terminal device 110 may monitor, on the USS set, the PDCCH above.

In some embodiments, the terminal device 110 may monitor, while the timer is running and on a Type1-physical downlink control channel (PDCCH) common search space (CSS) set of the serving cell or the primary cell, a physical downlink control channel associated with the response to the signal, using a cell radio network temporary identifier (C-RNTI). That is, when the timer is running, the terminal device 110 may monitor, on the CSS set, the PDCCH above.

In some embodiments, the terminal device 110 may stop the timer in response to the reception of the response to the signal. In some embodiments, the terminal device 110 may stop the timer in response to successful acquisition of the TA value.

In some embodiments, the terminal device 110 may retransmit the signal to the network device 120 in case the timer expires and the response is not received. In some embodiments, the terminal device 110 may retransmit the signal to the network device 120 in case the timer expires and the TA value is not successfully acquired.

In some embodiments, the terminal device 110 may start the timer upon the transmission of the signal.

In some embodiments, the terminal device 110 may postpone the start of the timer by a time delay upon the transmission of the signal. In this way, the embodiments may solve the problem of the beam alignment delay, synchronization delay and to accommodate potential long backhaul latency.

In some embodiments, the network device 120 may transmit, to the terminal device 110, the time delay for the terminal device 110 to postpone a start of the timer. In some embodiments, in order to transmit the time delay, the network device 120 may transmit, to the terminal device 110, a PDCCH order triggering the transmission of the signal and indicating the time delay.

In some embodiments, the time delay may be applied to a set of cells. Alternatively, or additionally, the time delay may be applied to a cell among a plurality of cells.

In some embodiments, the time delay is configured as a common time delay for a frequency layer via system information of the serving cell or the primary cell, or signaling dedicated to the terminal device 110, or any combination of the listed items.

In some embodiments, the time delay is indicated via dedicated signaling for configuring the time delay for the terminal device 110.

In some embodiments, the time delay is associated with a physical cell identifier (PCI) of the non-serving cell (the non-serving cell is a cell with PCI different from the serving cell). In some embodiments, the time delay is associated with a PCI of the secondary cell. Alternatively, or additionally, in some embodiments, the time delay is associated with a value of the timer.

In some embodiments, the terminal device 110 may receive, from the serving cell or the primary cell, a PDCCH order triggering the transmission of the signal and indicating the time delay: In some embodiments, the time delay is indicated by at least one of the following: a single value in the PDCCH order, a codepoint value in the PDCCH order, or a predefined DCI format of the PDCCH order.

In some embodiments, the signal may be a random access preamble. In some embodiments, the terminal device 110 may monitor, while the timer is running and a Type1-PDCCH CSS set of the serving cell or the primary cell, a physical downlink control channel associated with the response to the random access preamble, using a random access radio network temporary identifier (RA-RNTI). In some embodiments, based on receiving the response from the serving cell or the primary cell, the terminal device 110 may determine that a random access procedure is successfully completed.

In some embodiments, the timer corresponds to a random access response window. In some embodiments, the random access response window is separately configured for monitoring a reception of the response to a transmission associated with a PCI of the non-serving cell or the secondary cell.

In some embodiments, the (uplink) signal (that is transmitted by the UE to a non-serving cell/SCell in purpose of acquiring a TA value) may be a sounding reference signal (SRS).

Figure 3:
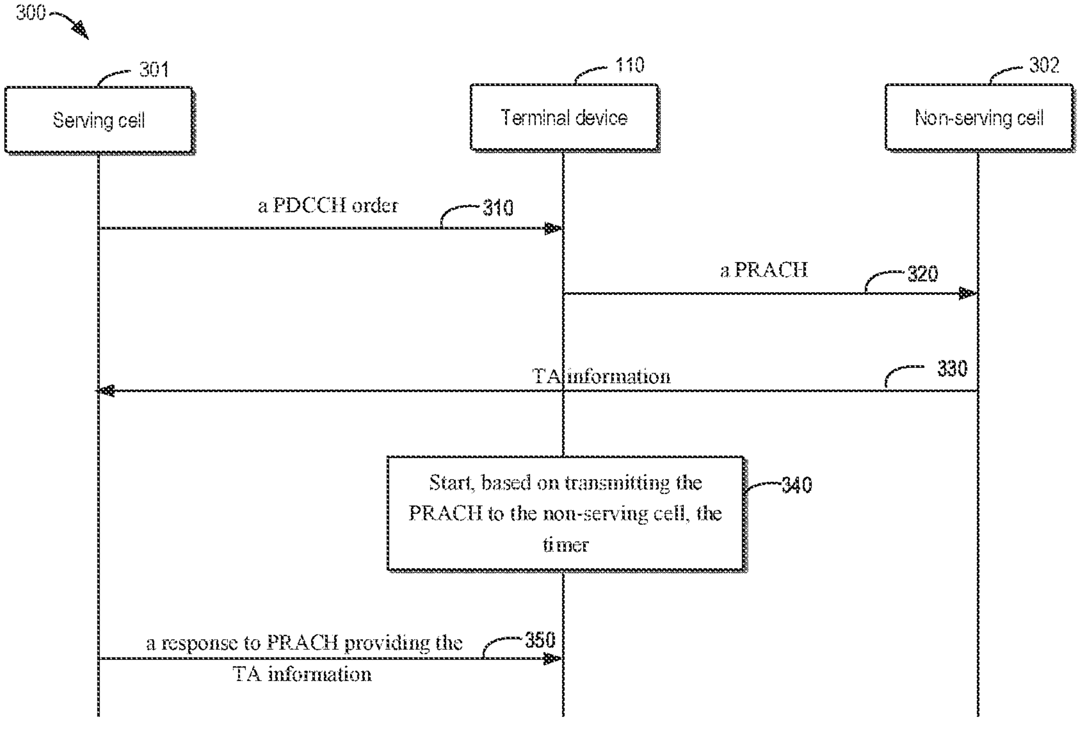
FIG. 3 illustrates a flowchart of PDCCH ordered PRACH (by a serving cell) to cell other than serving cell and monitoring response from the serving cell according to some embodiments of the present disclosure.

FIG. 3 illustrates a flowchart 300 of PDCCH ordered PRACH (by a serving cell) to cell other than a serving cell 301 and monitoring response from the serving cell 301 according to some embodiments of the present disclosure. As shown in FIG. 3, the serving cell 301 may be a cell 101 of the network device 120, and non-serving cell 302 may be a cell 102 of the network device 130. In some embodiments, the network device 120 and the network device 130 may be a same network device or different network device.

With reference to FIG. 3, the serving cell 301 transmits (310), to the terminal device 110, a PDCCH order (e.g. PRACH resource associated with SSB1-PCI #1). The terminal device 110 transmits (320) a PRACH (e.g. SSB1-PCI #1) to the non-serving cell 302. The non-serving cell 302 transmits (330), to the serving cell 301, TA information obtained on the PRACH associated with SSB1-PCI #1. The terminal device 110 starts (340) the timer based on transmitting the PRACH to the non-serving cell, and the timer is started for monitoring a response (from PCI #0)). When the serving cell 301 transmits (350), to the terminal device 110 the response to the PRACH providing TA information, then the terminal device 110 may acquire the TA information. The TA information may be the TA value. In some embodiments, the terminal device 110 may be UE.

Due to the beam alignment delay, synchronization delay (i.e. switch the reception back to serving cell) and to accommodate potential long backhaul latency, in some cases additional delay may be needed. Furthermore, since the proposed RACH procedure would deviate from the current QCL rules defined for RACH procedure, additional means and design would be needed to enable UE to perform the RA procedure where the random access (RA) preamble transmission and random access reception are from the different cells (e.g., serving/non-serving). Also the RA-RNTI that should be used by the cell transmitting the response to the UE PRACH transmission may not be known or may need to be separately obtained by the cell providing the response.

According to some embodiments of the present disclosure, the UE may be configured with a TA acquisition timer (an example of the timer mentioned above) used in a random access procedure (i.e. time supervising the procedure of obtaining a TA value associated with a cell e.g. a non-serving cell (with a different PCI than a serving cell) or a secondary cell.

In some embodiments, the TA acquisition timer is started when the UE transmits the RA preamble indicated by a DCI scheduling a PDCCH ordered RACH to a cell with different PCI than the serving cell. When the timer is running, the UE is configured to monitor the response to the RA preamble. To monitor the response, three options are provided as embodiments of the present disclosure.

Option 1: In some embodiments, the TA acquisition timer may perform monitoring on the configured USS(s) (UE dedicated search space configuration) of the serving cell that scheduled the DCI triggering the PDCCH order. In some embodiments, the TA acquisition timer may perform monitoring on the configured USS(s) (UE dedicated search space configuration) of serving cells (e.g. the response may be provided on one of the serving cells). In some embodiments, the UE monitors the configured DCI formats on the USS using the C-RNTI. In some embodiments, upon receiving a TA value (e.g. absolute TAC) associated with additional TA value identifier (e.g. with different TA group ID or a second TA group ID than currently used in the serving cell), UE determines the procedure for acquiring TA (e.g. RACH procedure) is successfully completed. In some embodiments, upon receiving a TA value associated with the cell for which the UL transmission for obtaining a TA value was made, the UE determines the procedure the to be successfully completed. In some embodiments, when the UE receives the TA value, the timer is stopped. In some embodiments, upon expiry of the timer (and no TA value is received), UE may determine to retransmit the configured preamble.

Option 2: In some embodiments, the TA acquisition timer may perform monitoring on the CSS-type1. In some embodiments, the UE monitors the configured DCI formats on the CSS-type1 using the C-RNTI (e.g. instead of RA-RNTI). In some embodiments, upon receiving the TA value (e.g. absolute TAC) associated with additional TA value identifier (e.g. with different TA group (TAG) ID or a second TA group ID than currently used in the serving cell) or receiving a TA value associated with the cell for which the transmission was made, the UE determines the procedure for acquiring TA (e.g. RACH procedure) is successfully completed, and the timer is stopped. In some embodiments, upon expiry of the timer (and no TA value is received), the UE may determine to retransmit the configured preamble.

Option 3: In some embodiments, the TA acquisition timer may perform monitoring on the CSS-type1 using the RA-RNTI associated with the transmission occasion of the transmission preamble. In some embodiments, upon receiving a RAR including a TA value (e.g. absolute TAC) associated with additional TA value identifier (e.g. with different TA group ID or a second TA group ID than currently used in the serving cell) or receiving a TA value associated with the cell for which the transmission was made, the UE determines the procedure for acquiring TA (e.g. RACH procedure) is successfully completed, and the timer is stopped. Upon expiry of the timer (and no TA value is received), UE may determine to retransmit the configured preamble.

In some embodiments, for the start of the TA acquisition timer, the UE may be configured to apply additional delay (i.e. the time delay mentioned above) before starting the timer when the RA procedure is triggered by the PDCCH order.

In any of the embodiments, acquiring a TA value as response to the transmission of an uplink signal, may refer to obtaining a TA value associated with different TAG id that is currently used in a serving cell (e.g. a primary cell or SCell). As an example, in a primary cell (PCell/SpCell, Special cell) UE may have a TA associated first TAG ID (e.g. #1) and when UE receives TA value associated with another TAG ID (e.g. #2) it may consider a TA value acquired as described herein. In any of the embodiments, acquiring a TA value as response to the transmission of an uplink signal, may refer to obtaining a TA value associated with TAG id that is currently used in a serving cell, wherein the serving cell may have one or more (e.g. two) TA values associated with one or more TAGS (e.g. two). In any of the embodiments, acquiring a TA value as response to the transmission of an uplink signal, may refer to obtaining a TA value associated with the cell for which the uplink transmission was made.

In some embodiments, the application of additional delay may be indicated by the PDCCH order using a single value (indicating apply/do not apply the delay). As an example, the DCI carrying the PDCCH order may comprise of a value/bit/field/codepoint indicating whether or not additional delay is applied for the start of the RA response window. In some embodiments, if the bit is set to apply (e.g. '1'), the UE applies a configured value of response_monitoring_delay for delaying the start of the timer for acquiring TA value (e.g. RA-response window). If the bit is set to do-not-apply (e.g. '0'), the UE does not apply any additional delay or assumes the value of response_monitoring_delay=0). In some embodiments, the value of response_monitoring_delay may be configured by network, e.g. to have value of X ms (e.g. 20 ms, 40 ms etc.) configured by the network device 120. The response_monitoring_delay is only an example name for the delay parameter. In any of the embodiments, the delay value for delaying the start of the timer for monitoring response, may be an additional delay value which is applied in addition to other offsets/delays applied for the start of the timer after transmission of the uplink signal. Alternatively, the delay may be a total delay value that the UE is configured to wait before starting the timer for monitoring the response of the uplink transmission for obtaining the TA value.

In some embodiments, the application of additional delay value may be indicated by the PDCCH order using a codepoint value. In some embodiments, each codepoint refers to a response_monitoring_delay that may be RRC configured (or fixed values). As an example, if 2 bit codepoint values are used '00b'=0 ms, '01b'=20 ms, '10b'=40 ms, '11b'=80 ms). In some other embodiments, different 2-bit or any N-bit, where N>0), combinations may be associated with number of OFDM symbols or slots.

In some embodiments, the application of additional delay may be indicated by the PDCCH order using a specific DCI format. As an example, if UE decodes a PDCCH order with specific DCI format, it applies the response_monitoring_delay. Otherwise, it does apply the response_monitoring_delay. The response_monitoring_delay value may be configured by network (for example the delay can be configured by the network device 120).

In some embodiments, the UE may be configured with a common starting delay for the frequency layer. In some embodiments, a frequency layer specific value response_monitoring_delay is provided in system information and/or dedicated signaling to UEs.

In some embodiments, the UE may be configured with a list of PCIs for which the delay (which may be configured by RRC) is applied. In some embodiments, a set of PCIs may be associated with a value response_monitoring_delay. In some other embodiments, there may be one or more sets of PCIs associated with set specific response_monitoring_delay value. In some other embodiments, the response_monitoring_delay may be cell specific.

In some embodiments, if the additional delay is signaled by the response_monitoring_delay, the UE applies the delay value when the PDCCH order triggering RACH (or SRS or any uplink signal used for TA acquisition) is targeted to a different PCI than the serving cell.

In some embodiments, if additional delay is signaled by the response_monitoring_delay, UE applies TA acquisition timer (timer value) value that is associated with the configuration of additional delay (i.e. if additional delay is indicated, UE uses the acquisition timer value that is separately configured valued).

In any of the embodiments herein, the TA acquisition may refer to obtain a TA value for a non-serving cell (i.e. a cell with different PCI than a serving cell) or a serving cell (e.g. SCell).

In any of the embodiments herein, the TA value refers to a timing advance value used for determining advancement of an uplink transmission timing with respect to a downlink reference timing.

In some embodiments, the TA value provided to UE (as response to the UE uplink signal transmission) may be the absolute TAC (MAC CE). In some embodiments, the TA value may be provided using (relative) TAC that may provide the TA value by providing a TA value relative to the TA value used in the serving cell (that triggered the uplink signal for TA acquisition to non-serving cell) or relative value to a specific TAG (timing advance group).

In some embodiments, the target cell for the PDCCH ordered RACH for which the TA acquisition timer (and the delay for starting the timer) is applied may be a SCell. In one example the delay applied for starting the TA acquisition timer may be SCell or SCell group specific. In a further example the TA acquisition timer value applied for monitoring the response to the uplink transmission (for obtaining a TA) may be SCell or SCell group specific (e.g. for a set of one or more SCells, the same timer value may be applied/configured).

In some embodiments, the target cell for the PDCCH ordered RACH for which the TA acquisition timer is applied (and the delay for starting the timer) may be a non-serving cell. In a further example the delay applied for starting the TA acquisition timer may be PCI or PCI group specific (e.g. for a set of one or more PCIs, the same delay value may be applied). One or more PCI groups with group specific delay values may be configured. In a further example the TA acquisition timer value applied for monitoring the response to the uplink transmission (for obtaining a TA) may be PCI or PCI group specific (e.g. for set of one or more PCIs, the same timer value may be applied/configured).

In some embodiments the TA acquisition timer may be implemented using the configuration of TA acquisition timer.

In some embodiments, the TA acquisition timer e.g. in Option 2 and Option 3 (mentioned above) may be the RA-response window:

In some embodiments, the UE applies a separately configured ra-response_window_PCI (i.e. a timer value that is used for monitoring the response to UL transmission for obtaining a TA value) when the PDCCH ordered RACH is triggered to a cell different than serving cell. This timer may be separately configured e.g. using RRC signaling.

In some embodiments, in any of the transmission triggering the start of the TA acquisition timer may be a SRS (sounding reference signal) (use the procedure in Option 1 above) transmission wherein the target of the SRS transmission is a cell with different PCI than serving cell. In some embodiments the response monitoring may be delayed by a configured/indicated value (wherein the value indicates a time delay). This value may be provided in a SRS configuration or in a downlink control message triggering the SRS transmission for TA acquisition.

With reference to Option 1 above, in some embodiments, the TA acquisition timer starts at the first symbol of the earliest CORESET the UE is configured to receive PDCCH for USS set that is at least one symbol, after the last symbol of the uplink signal transmission occasion (e.g. PRACH occasion) corresponding to the uplink signal (e.g. PRACH) transmission, the time to start the TA acquisition timer may be called time1. In some other embodiments, the timer starts (at the time1 above) is delayed by the value: response_monitoring_delay as described herein.

With reference to Option 2 above, in some embodiments, the TA acquisition timer starts at the first symbol of the earliest CORESET the UE is configured to receive PDCCH for Type1-PDCCH CSS set that is at least one symbol, after the last symbol of the uplink signal transmission occasion (e.g. PRACH occasion) corresponding to the uplink signal (e.g. PRACH) transmission, the time to start the TA acquisition timer may be called time2. In some other embodiments, the timer start (at time2 above) is delayed by the value: response_monitoring_delay as described herein.

With reference to Option 3 above, in some embodiments, the TA acquisition timer starts at the first symbol of the earliest CORESET the UE is configured to receive PDCCH for Type1-PDCCH CSS set that is at least one symbol, after the last symbol of the PRACH occasion corresponding to the PRACH transmission, the time to start the TA acquisition timer may be called time3. In some other embodiments, the timer start (at time3 above) is delayed by the value: response_monitoring_delay as described herein.

With reference to Option 1 or Option 2 above, in some embodiments, exemplary process performed by the UE the following steps (USS monitoring Option 1/2): Step1, the UE is configured/signaled with the TA acquisition timer, which is started when transmitting PRACH preamble to the non-serving cell: Step1, the UE is configured with contention free random access resources to the non-serving cell (PDCCH triggered random access: Step3, the UE receives PDCCH triggering CFRA to the non-serving cell including the SSB based on which the UE performs PRACH RO (RACH Occasion) and preamble selection: Step4, the UE transmits PRACH preamble to the non-serving cell on the resource corresponding to the provided SSB: Step5, the UE determines the start of the TA acquisition timer in serving cell based on the transmission time of the PRACH preamble and the configured starting delay; Step6, the UE starts monitoring PDCCH scheduling the TAC on USS/CSS (with C-RNTI) at the time determined in the Step 5.

With reference to Option 3 above, in some embodiments, exemplary process performed by the UE the following steps: Step1, the UE is configured/signaled with the starting delay of the RAR window (TA acquisition timer is implemented as using the RAR window) when transmitting PRACH preamble to the non-serving cell: Step2, the UE is configured with contention free random access resources to the non-serving cell (PDCCH triggered random access: Step3, the UE receives PDCCH triggering CFRA to the non-serving cell including the SSB based on which the UE performs PRACH RO and preamble selection; Step4, the UE transmits PRACH preamble to the non-serving cell on the resource corresponding to the provided SSB: Step5, the UE determines the start of the RAR window in serving cell based on the transmission time of the PRACH preamble and the configured starting delay: Step6, the UE starts monitoring PDCCH scheduling RAR at the time determined in the Step 5.

FIG. 4 illustrates a flowchart of a method 400 implemented at the terminal device 110 according to some embodiments of the present disclosure. The terminal device 110 is connected with a serving cell or a primary cell of the terminal device 110. At block 410, the terminal device 110 may transmit a signal to the network device 120 (or 130) supporting a non-serving cell or a secondary cell of the terminal device 110, wherein a physical cell identifier (PCI) of the non-serving cell is different from a PCI of the serving cell. At block 420, the terminal device may start, based on the transmission of the signal, a timer at the terminal device 110. At block 430, the terminal device 110 may acquire, while the timer is running, a timing advance (TA) value associated with the non-serving cell or the secondary cell.

In one embodiment based on transmitting an uplink (UL) signal to a non-serving cell (a cell with different PCI than serving cell), a timer is started for acquiring a timing advance (TA) value associated with the non-serving cell, and monitoring, when the timer is running, a response to the UL signal from the serving cell (e.g. a cell that triggered the uplink signal for acquiring the TA value), the response indicating the TA value.

In some embodiments, the terminal device 110 may receive, from the serving cell or the primary cell, a response to the signal, wherein the response comprises the TA value associated with the non-serving cell or the secondary cell.

In some embodiments, the terminal device 110 may monitor, while the timer is running and on a UE dedicated search space (USS) set of the serving cell or the primary cell, a physical downlink control channel associated with the response to the signal, using a cell radio network temporary identifier (C-RNTI).

In some embodiments, the terminal device 110 may monitor the response (to the uplink transmission for obtaining a TA value) on at least one search space (USS/CSS/CSStype-1) using at least one RNTI for a downlink control message scheduling a downlink transmission that provides the TA value (e.g. PDSCH scheduled by the DCI may carry a MAC CE providing at least the TA value associated with the uplink transmission). In some embodiments, the RNTI may be C-RNTI or RA-RNTI.

In some embodiments, the terminal device 110 may monitor, while the timer is running and on a Type1-physical downlink control channel (PDCCH) common search space (CSS) set of the serving cell or the primary cell, a physical downlink control channel associated with the response to the signal, using a cell radio network temporary identifier (C-RNTI).

In some embodiments, the terminal device 110 may stop the timer in response to the reception of the response to the signal. In some embodiments, the terminal device 110 may stop the timer in response to successful acquisition of the TA value.

In some embodiments, the terminal device 110 may retransmit the signal to the network device 120 (or 130) in case the timer expires and the response is not received. In some embodiments, the terminal device 110 may retransmit the signal to the network device 120 (or 130) in case the timer expires and the TA value is not successfully acquired.

In some embodiments, the terminal device 110 may start the timer upon the transmission of the signal.

In some embodiments, the terminal device 110 may postpone the start of the timer by a time delay upon the transmission of the signal.

In some embodiments, the time delay may be applied to one of the following: a set of cells: or a cell among a plurality of cells.

In some embodiments, the time delay may be configured as a common time delay for a frequency layer via system information of the serving cell or the primary cell, or signaling dedicated to the terminal device 110, or any combination of the listed items.

In some embodiments, the time delay may be indicated via dedicated signaling for configuring the time delay for the terminal device 110.

In some embodiments, the time delay may be associated with a physical cell identifier (PCI) of the non-serving cell or the secondary cell. In some embodiments, the time delay may be associated with a value of the timer.

In some embodiments, prior to transmitting the signal to the network device 120 (or 130), the terminal device 110 may receive a configuration of the timer from the serving cell or the primary cell.

In some embodiments, the terminal device 110 may receive, from the serving cell or the primary cell, a PDCCH order triggering the transmission of the signal and indicating the time delay:

In some embodiments, the time delay is indicated by at least one of the following: a single value in the PDCCH order, a codepoint value in the PDCCH order, or a pre-defined DCI format of the PDCCH order.

In some embodiments, the signal may be a random access preamble. In some embodiments, the terminal device 110 may monitor, while the timer is running and a Type1-PDCCH CSS set of the serving cell or the primary cell, a physical downlink control channel associated with the response to the random access preamble, using a random access radio network temporary identifier (RA-RNTI). In some embodiments, the timer corresponds to a random access response window. In some embodiments, the random access response window is separately configured for monitoring a reception of the response to a transmission associated with a PCI of the non-serving cell or the secondary cell.

In some embodiments, based on receiving the response (e.g. a TA value) from the serving cell or the primary cell, the terminal device 110 may determine that a procedure for acquiring TA (e.g. random access procedure or SRS transmission initiated procedure) is successfully completed.

In some embodiments, the signal is a sounding reference signal (SRS).

FIG. 5 illustrates a flowchart of a method 500 implemented at a network device 120 according to some embodiments of the present disclosure. At block 510, the network device 120 may transmit, to the terminal device 110 being connected with a serving cell or a primary cell of the terminal device 110, a configuration of a timer at the terminal device 110 for the terminal device 110 to acquire a timing advance (TA) value associated with a non-serving cell or a secondary cell of the terminal device 110 while the timer is running, wherein a physical cell identifier (PCI) of the non-serving cell is different from a PCI of the serving cell.

In some embodiments, the transmission of the configuration of the timer may be on the serving cell or the primary cell.

According to FIG. 5, that is, the network device 120 may transmit the configuration above to the terminal device 110. The terminal device 110 is connected with a serving cell or a primary cell of the terminal device 110. While the timer is running, the timer may be used for the terminal device 110 acquire a timing advance (TA) value associated with a non-serving cell or a secondary cell of the terminal device 110.

In some embodiments, the configuration of the timer may include a value of the timer.

In some embodiments, the configuration may indicate the terminal device 110 to at least one of the following: start the timer based on transmission of a signal to the network device 120 (or 130): or stop the timer in response to the reception of the response to the signal or successful acquisition of the TA value.

In some embodiments, the network device 120 may transmit, to the terminal device 110, a time delay for the terminal device 110 to postpone a start of the timer.

In some embodiments, in order to transmit the time delay, the network device 120 may transmit, to the terminal device 110 and on the serving cell or the primary cell, a PDCCH order triggering the transmission of the signal and indicating the time delay.

In some embodiments, the time delay may be applied to a set of cells. Alternatively, or additionally, the time delay may be applied to a cell among a plurality of cells.

In some embodiments, the time delay is configured as a common time delay for a frequency layer via at least one of the following: system information of the serving cell or the primary cell, or signaling dedicated to the terminal device 110.

In some embodiments, the time delay is indicated via dedicated signaling for configuring the time delay for the terminal device 110.

In some embodiments, the time delay is associated with a physical cell identifier (PCI) of the non-serving cell or the secondary cell. Alternatively, or additionally, in some embodiments, the time delay is associated with a value of the timer.

In some embodiments, the network device 120 may transmit, to the terminal device 110 and on the serving cell or the primary cell, a response to the signal, wherein the response comprises the TA value.

In some embodiments, the network device 120 may transmit, to the terminal device 110, downlink control information associated with the response, wherein the downlink control information is on at least one search space set (USS/CSS/CSStype-1) of the serving cell or the primary cell and with CRC scrambled by a C-RNTI or a RA-RNTI.

In some embodiments, the signal is at least one of a random access preamble or a sounding reference signal (SRS).

In some embodiments, an apparatus capable of performing any of the method 400 (for example, the terminal device 110) may comprise means for performing the respective steps of the method 400. The means may be implemented in any suitable form. For example, the means may be implemented in a circuitry or software module.

In some embodiments, the apparatus comprises means for transmitting, by a terminal device 110 being connected with a serving cell or a primary cell of the terminal device 110, a signal to a network device 120 (or 130) supporting a non-serving cell or a secondary cell of the terminal device 110, wherein a physical cell identifier (PCI) of the non-serving cell is different from a PCI of the serving cell, and wherein a physical cell identifier (PCI) of the secondary cell is different from or same as a PCI of the primary cell: means for starting, by the terminal device 110 and based on the transmission of the signal, a timer at the terminal device 110; and means for acquiring, by the terminal device 110 and while the timer is running, a timing advance (TA) value associated with the non-serving cell or the secondary cell.

In some embodiments, the apparatus comprises means for receiving, from the serving cell or the primary cell, a response to the signal, wherein the response comprises the TA value associated with the non-serving cell or the secondary cell.

In some embodiments, the apparatus comprises means for monitoring, while the timer is running and on a UE dedicated search space (USS) set of the serving cell or the primary cell, a physical downlink control channel associated with the response to the signal, using a cell radio network temporary identifier (C-RNTI).

In some embodiments, the apparatus comprises means for monitoring, while the timer is running and on a Type1-physical downlink control channel (PDCCH) common search space (CSS) set of the serving cell or the primary cell, a physical downlink control channel associated with the response to the signal, using a cell radio network temporary identifier (C-RNTI).

In some embodiments, the apparatus comprises means for stopping the timer in response to the reception of the response to the signal. In some embodiments, the apparatus comprises means for stopping the timer in response to successful acquisition of the TA value.

In some embodiments, the apparatus comprises means for retransmitting the signal to the network device 120 (or 130) in case the timer expires and the response is not received. In some embodiments, the apparatus comprises means for retransmitting the signal to the network device 120 (or 130) in case the timer expires and the TA value is not successfully acquired.

In some embodiments, the means for starting the timer comprises means for starting the timer upon the transmission of the signal.

In some embodiments, the apparatus comprises means for postponing the start of the timer by a time delay upon the transmission of the signal.

In some embodiments, the time delay is applied to one of the following: a set of cells; or a cell among a plurality of cells.

In some embodiments, the time delay is configured as a common time delay for a frequency layer via at least one of the following: system information of the serving cell or the primary cell, or signaling dedicated to the terminal device 110.

In some embodiments, the time delay is indicated via dedicated signaling for configuring the time delay for the terminal device 110.

In some embodiments, the time delay is associated with a physical cell identifier (PCI) of the non-serving cell or the secondary cell. In some embodiments, the time delay is associated with a value of the timer.

In some embodiments, the apparatus comprises means for prior to transmitting the signal to the network device 120 (or 130), receive a configuration of the timer from the serving cell or the primary cell.

In some embodiments, the apparatus comprises means for receiving, from the serving cell or the primary cell, a PDCCH order triggering the transmission of the signal and indicating the time delay.

In some embodiments, the time delay is indicated by at least one of the following:

a single value in the PDCCH order, a codepoint value in the PDCCH order, or a predefined DCI format of the PDCCH order.

In some embodiments, the signal is a random access preamble.

In some embodiments, the apparatus comprises means for monitoring, while the timer is running and a Type1-PDCCH CSS set of the serving cell or the primary cell, a physical downlink control channel associated with the response to the random access preamble, using a random access radio network temporary identifier (RA-RNTI).

In some embodiments, the apparatus comprises means for based on receiving the response from the serving cell or the primary cell, determining that a random access procedure is successfully completed.

In some embodiments, the timer corresponds to a random access response window.

In some embodiments, the random access response window is separately configured for monitoring a reception of the response to a transmission associated with a PCI of the non-serving cell or the secondary cell.

In some embodiments, the signal is a sounding reference signal (SRS).

In some embodiments, the apparatus further comprises means for performing other steps in some embodiments of the method 400. In some embodiments, the means comprises at least one processor: and at least one memory including computer program code, the at least one memory and computer program code configured to, with the at least one processor, cause the performance of the apparatus.

In some embodiments, an apparatus capable of performing any of the method 500 (for example, the network device 120) may comprise means for performing the respective steps of the method 500. The means may be implemented in any suitable form. For example, the means may be implemented in a circuitry or software module.

In some embodiments, the apparatus comprises means for transmitting, by a network device 120 and to a terminal device 110 being connected with a serving cell or a primary cell of the terminal device 110, a configuration of a timer at the terminal device 110 for the terminal device 110 to acquire a timing advance (TA) value associated with a non-serving cell or a secondary cell of the terminal device 110 while the timer is running, wherein a physical cell identifier (PCI) of the non-serving cell is different from a PCI of the serving cell.

In some embodiments, the transmission of the configuration of the timer may be on the serving cell or the primary cell.

In some embodiments, the apparatus comprises means for transmitting to the terminal device 110, a time delay for the terminal device 110 to postpone a start of the timer.

In some embodiments, the configuration of the timer includes a value of the timer.

In some embodiments, the configuration indicates the terminal device 110 to at least one of the following: start the timer based on transmission of a signal to the network device 120 (or 130): or stop the timer in response to the reception of the response to the signal or successful acquisition of the TA value.

In some embodiments, means for transmitting the time delay comprises means for transmitting, to the terminal device 110 and on the serving cell or the primary cell, a PDCCH order triggering the transmission of the signal and indicating the time delay.

In some embodiments, the time delay is applied to at least one of: a set of cells: or the time delay may be applied to a cell among a plurality of cells.

In some embodiments, the time delay is configured as a common time delay for a frequency layer via at least one of the following: system information of the serving cell or the primary cell, or signaling dedicated to the terminal device 110.

In some embodiments, the time delay is indicated via dedicated signaling for configuring the time delay for the terminal device 110.

In some embodiments, the time delay is associated with a physical cell identifier (PCI) of the non-serving cell or the secondary cell. Alternatively, or additionally, the time delay is associated with a value of the timer.

In some embodiments, the network device 120 may transmit, to the terminal device 110 and on the serving cell or the primary cell, a response to the signal, wherein the response comprises the TA value.

In some embodiments, the network device 120 may transmit, to the terminal device 110, downlink control information associated with the response, wherein the downlink control information is on at least one search space set (USS/CSS/CSStype-1) of the serving cell or the primary cell and with CRC scrambled by a C-RNTI or a RA-RNTI.

In some embodiments, the signal is at least one of a random access preamble or a sounding reference signal (SRS).

In some embodiments, the apparatus further comprises means for performing other steps in some embodiments of the method 500. In some embodiments, the means comprises at least one processor: and at least one memory including computer program code, the at least one memory and computer program code configured to, with the at least one processor, cause the performance of the apparatus.

Figure 6:
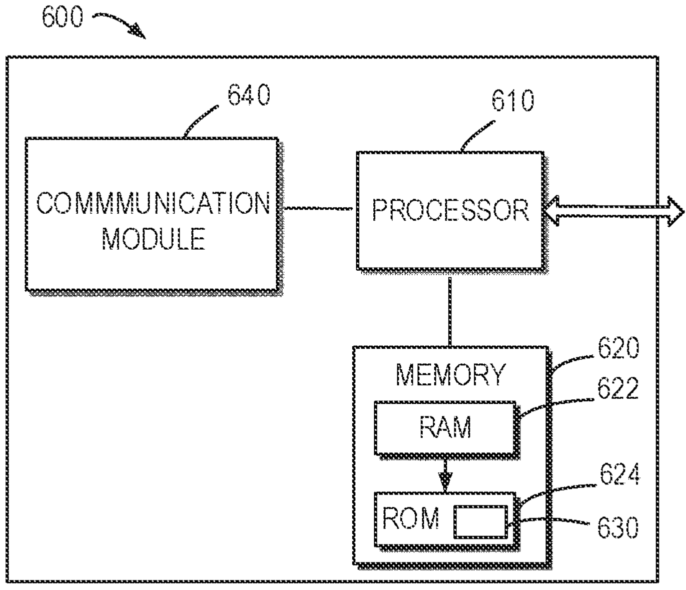
FIG. 6 illustrates a simplified block diagram of an apparatus that is suitable for implementing embodiments of the present disclosure.

FIG. 6 is a simplified block diagram of a device 600 that is suitable for implementing embodiments of the present disclosure. The device 600 may be provided to implement the communication device, for example the terminal device 110, the network device 120 as shown in FIG. 1A. As shown, the device 600 includes one or more processors 610, one or more memories 640 coupled to the processor 610, and one or more transmitters and/or receivers (TX/RX) 640 coupled to the processor 610.

The TX/RX 640 is for bidirectional communications. The TX/RX 640 has at least one antenna to facilitate communication. The communication interface may represent any interface that is necessary for communication with other network elements.

The processor 610 may be of any type suitable to the local technical network and may include one or more of the following: general purpose computers, special purpose computers, microprocessors, digital signal processors (DSPs) and processors based on multicore processor architecture, as non-limiting examples. The device 600 may have multiple processors, such as an application specific integrated circuit chip that is slaved in time to a clock which synchronizes the main processor.

The memory 620 may include one or more non-volatile memories and one or more volatile memories. Examples of the non-volatile memories include, but are not limited to, a Read Only Memory (ROM) 624, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 622 and other volatile memories that will not last in the power-down duration.

A computer program 630 includes computer executable instructions that are executed by the associated processor 610. The program 630 may be stored in the ROM 1020. The processor 610 may perform any suitable actions and processing by loading the program 630) into the RAM 622.

The embodiments of the present disclosure may be implemented by means of the program 630 so that the device 600 may perform any process of the disclosure as discussed with reference to FIGS. 2 to 5. The embodiments of the present disclosure may also be implemented by hardware or by a combination of software and hardware.

Figure 7:
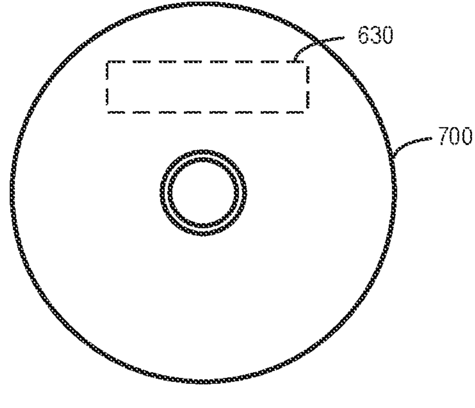
FIG. 7 illustrates a block diagram of an example computer readable medium in accordance with some embodiments of the present disclosure.

In some embodiments, the program 630) may be tangibly contained in a computer readable medium which may be included in the device 600 (such as in the memory 620) or other storage devices that are accessible by the device 600. The device 600 may load the program 630) from the computer readable medium to the RAM 622 for execution. The computer readable medium may include any types of tangible non-volatile storage, such as ROM, EPROM, a flash memory, a hard disk, CD, DVD, and the like. FIG. 7 shows an example of the computer readable medium 700 in form of CD or DVD. The computer readable medium has the program 630 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 600 as described above with reference to FIGS. 2-5. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory;" as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device comprising:

at least one processor; and at least one memory storing instructions that, when executed by the at least one processor, cause the terminal device being connected with a serving cell or a primary cell of the terminal device, at least to:

transmit a signal to a network device supporting a non-serving cell or a secondary cell of the terminal device, wherein a physical cell identifier (PCI) of the non-serving cell is different from a PCI of the serving cell;

start, based on the transmission of the signal, a timer at the terminal device for obtaining a timing advance (TA) value associated with the non-serving cell or the secondary cell; and acquire, while the timer is running, the TA value associated with the non-serving cell or the secondary cell, wherein the terminal device is caused to:

receive, from the serving cell or the primary cell, a response to the signal, wherein the response comprises the TA value associated with the non-serving cell or the secondary cell; and monitor, while the timer is running and on a UE dedicated search space set of the serving cell or the primary cell, a physical downlink control channel associated with the response to the signal, using a cell radio network temporary identifier.

2. The terminal device of claim 1, wherein the terminal device is caused to monitor, while the timer is running and on a Type1-physical downlink control channel (PDCCH) common search space set of the serving cell or the primary cell, a physical downlink control channel associated with the response to the signal, using a cell radio network temporary identifier.

3. The terminal device of claim 1, wherein the terminal device is caused to stop the timer in response to the reception of the response to the signal.

4. The terminal device of claim 1, wherein the terminal device is caused to retransmit the signal to the network device in case the timer expires and the response is not received.

5. The terminal device of claim 1, wherein the terminal device is caused to start the timer upon the transmission of the signal.

6. The terminal device of claim 1, wherein the terminal device is caused to postpone the start of the timer by a time delay upon the transmission of the signal.

7. The terminal device of claim 6, wherein the time delay is applied to one of the following:

a set of cells; or a cell among a plurality of cells.

8. The terminal device of claim 6, wherein the time delay is configured as a common time delay for a frequency layer via at least one of the following:

system information of the serving cell or the primary cell, or signaling dedicated to the terminal device.

9. The terminal device of claim 6, wherein the time delay is indicated via dedicated signaling for configuring the time delay for the terminal device.

10. The terminal device of claim 6, wherein the time delay is associated with a value of the timer.

11. The terminal device of claim 6, wherein the terminal device is caused to: receive, from the serving cell or the primary cell, a PDCCH order triggering the transmission of the signal and indicating the time delay.

12. The terminal device of claim 1, wherein the terminal device is caused to: prior to transmitting the signal to the network device, receive a configuration of the timer from the serving cell or the primary cell.

13. The terminal device of claim 1, wherein the signal is a random access preamble.

14. The terminal device of claim 13, wherein the timer corresponds to a random access response window.

15. The terminal device of claim 1, wherein the signal is a sounding reference signal.

16. A method comprising:

transmitting, by a terminal device being connected with a serving cell or a primary cell of the terminal device, a signal to a network device supporting a non-serving cell or a secondary cell of the terminal device, wherein a physical cell identifier (PCI) of the non-serving cell is different from a PCI of the serving cell;

starting, by the terminal device and based on the transmission of the signal, a timer at the terminal device for obtaining a timing advance (TA) value associated with the non-serving cell or the secondary cell; and acquiring, by the terminal device and while the timer is running, the TA value associated with the non-serving cell or the secondary cell, wherein the method further comprises:

receiving, from the serving cell or the primary cell, a response to the signal, wherein the response comprises the TA value associated with the non-serving cell or the secondary cell; and monitoring, while the timer is running and on a UE dedicated search space set of the serving cell or the primary cell, a physical downlink control channel associated with the response to the signal, using a cell radio network temporary identifier.

17. A terminal device comprising:

at least one processor; and at least one memory storing instructions that, when executed by the at least one processor, cause the terminal device being connected with a serving cell or a primary cell of the terminal device, at least to:

transmit a signal to a network device supporting a non-serving cell or a secondary cell of the terminal device, wherein a physical cell identifier (PCI) of the non-serving cell is different from a PCI of the serving cell;

start, based on the transmission of the signal, a timer at the terminal device for obtaining a timing advance (TA) value associated with the non-serving cell or the secondary cell; and acquire, while the timer is running, the TA value associated with the non-serving cell or the secondary cell, wherein the terminal device is caused to postpone the start of the timer by a time delay upon the transmission of the signal, wherein the time delay is configured as a common time delay for a frequency layer via at least one of the following:

system information of the serving cell or the primary cell, or signaling dedicated to the terminal device.

* * * * *